United States Patent [19]

Ochi

[11] Patent Number: 5,570,308
[45] Date of Patent: Oct. 29, 1996

[54] METHOD OF PROCESSING DIGITAL AUDIO SIGNALS OF DIFFERENT SAMPLING RATES

[75] Inventor: Keiichi Ochi, Takarazuka, Japan

[73] Assignee: Ricoh Company, Ltd., Tokyo, Japan

[21] Appl. No.: 360,016

[22] Filed: Dec. 20, 1994

[30] Foreign Application Priority Data

Dec. 20, 1993 [JP] Japan .................................. 5-320637

[51] Int. Cl.⁶ .................................................. G06F 15/31
[52] U.S. Cl. ...................................................... 364/724.1
[58] Field of Search ........................... 364/724.1, 724.01; 341/123

[56] References Cited

U.S. PATENT DOCUMENTS

| | | | |
|---|---|---|---|
| 5,023,825 | 6/1991 | Luthra et al. | 364/724.1 |
| 5,317,529 | 5/1994 | Teraoka et al. | 364/724.1 |
| 5,365,468 | 11/1994 | Kakubo et al. | 364/724.1 |
| 5,398,029 | 3/1995 | Toyama et al. | 364/724.1 |
| 5,432,511 | 7/1995 | Sadjadian et al. | 364/724.1 |

*Primary Examiner*—Tan V. Mai
*Attorney, Agent, or Firm*—Cooper & Dunham LLP

[57] ABSTRACT

A method of processing input digital audio signals of different sampling rates, includes steps of: providing a digital filter circuit having a random access memory (RAM) for storing input digital audio signals of different sampling rates for each of channels, a read only memory (ROM) for storing groups of digital filter coefficients, and an accumulator for executing multiplications and additions based on the input digital audio signals and the digital filter coefficients; reading the input digital audio signals of each sampling rate from the RAM; reading the digital filter coefficients of each group from the ROM; sequentially allocating one of divided time portions of one cycle of a unified sampling rate to the digital filter circuit, so that the accumulator executes the multiplications and additions for each channel during the allocated time portion so as to produce processed digital audio signals for all the channels within the one cycle; and outputting the processed digital audio signals for each of the channels at the unified sampling rate.

8 Claims, 14 Drawing Sheets

FIG. 4

| | → g | | | | | | |
|---|---|---|---|---|---|---|---|
| ↓ | | 0 | 1 | 2 | 3 | 4 | 5 | 6 |
| k | [ 0] | 0 | 3 | 6 | 2 | 5 | 1 | 4 |
| | [ 1] | 7 | 10 | 13 | 9 | 12 | 8 | 11 |
| | [ 2] | 14 | 17 | 20 | 16 | 19 | 15 | 18 |
| | [ 3] | 21 | 24 | 27 | 23 | 26 | 22 | 25 |
| | [ 4] | 28 | 31 | 34 | 30 | 33 | 29 | 32 |
| | [ 5] | 35 | 38 | 41 | 37 | 40 | 36 | 39 |
| | [ 6] | 42 | 45 | 48 | 44 | 47 | 43 | 46 |
| | [ 7] | 49 | 52 | 55 | 51 | 54 | 50 | 53 |
| | [ 8] | 56 | 59 | 62 | 58 | 61 | 57 | 60 |
| | [ 9] | 63 | 66 | 69 | 65 | 68 | 64 | 67 |
| | [10] | 70 | 73 | 76 | 72 | 75 | 71 | 74 |
| | [11] | 77 | 80 | 83 | 79 | 82 | 78 | 81 |
| | [12] | 84 | 87 | 90 | 86 | 89 | 85 | 88 |
| | [13] | 91 | 94 | 97 | 93 | 96 | 92 | 95 |
| | [14] | 98 | 101 | 104 | 100 | 103 | 99 | 102 |
| | [15] | 105 | 108 | 111 | 107 | 110 | 106 | 109 |
| | [16] | 111 | 108 | 105 | 109 | 106 | 110 | 107 |
| | [17] | 104 | 101 | 98 | 102 | 99 | 103 | 100 |
| | [18] | 97 | 94 | 91 | 95 | 92 | 96 | 93 |
| | [19] | 90 | 87 | 84 | 88 | 85 | 89 | 86 |
| | [20] | 83 | 80 | 77 | 81 | 78 | 82 | 79 |
| | [21] | 76 | 73 | 70 | 74 | 71 | 75 | 72 |
| | [22] | 69 | 66 | 63 | 67 | 64 | 68 | 65 |
| | [23] | 62 | 59 | 56 | 60 | 57 | 61 | 58 |
| | [24] | 55 | 52 | 49 | 53 | 50 | 54 | 51 |
| | [25] | 48 | 45 | 42 | 46 | 43 | 47 | 44 |
| | [26] | 41 | 38 | 35 | 39 | 36 | 40 | 37 |
| | [27] | 34 | 31 | 28 | 32 | 29 | 33 | 30 |
| | [28] | 27 | 24 | 21 | 25 | 22 | 26 | 23 |
| | [29] | 20 | 17 | 14 | 18 | 15 | 19 | 16 |
| | [30] | 13 | 10 | 7 | 11 | 8 | 12 | 9 |
| | [31] | 6 | 3 | 0 | 4 | 1 | 5 | 2 |
| | BNK | 0 | 1 | $\overline{0}$ | 2 | 3 | $\overline{3}$ | $\overline{2}$ |

FIG. 5

| | RAM | | | | | CHANNEL | LEVEL | OFFSET |
|---|---|---|---|---|---|---|---|---|
| | ch. D LVL C, D | 207 | | | | | | |
| | | 200 | | | 11001000 | | | |
| | ch. C LVL C, D | 192 | | | 11000000 | D | C, D_2nd | 11001... |
| | ch. D LVL B, C | | | | | | B, C_1st | 101..... |
| | | 160 | | | 10100000 | | | |
| | ch. C LVL B, C | | | | | C | C, D_2nd | 11000... |
| | | 128 | | | 10000000 | | B, C_1st | 100..... |
| | ch. B LVL DA, B, C | 96 | | | 01100000 | | C_2nd | 01100... |
| | | | | | | B | B, C_1st | 010..... |
| | | 64 | | | 01000000 | | DA | 01...... |
| | ch. A LVL DA, B, C | 32 | | | 00100000 | A | C_2nd | 00100... |
| | | | | | | | B, C_1st | 000..... |
| | | 0 | | | 00000000 | | DA | 00...... |

| ROM | | |
|---|---|---|
| LVL C, D | 160 | 10100000 |
| LVL DA | | |
| LVL B, C, D | 128 | 10000000 |
| Bank3 | | |
| | 96 | 01100000 |
| Bank2 | | |
| | 64 | 01000000 |
| Bank1 | | |
| | 32 | 00100000 |
| Bank0 | | |
| | 0 | 00000000 |

(a)

| CHANNEL | LEVEL | | OFFSET |
|---|---|---|---|
| COMMON | C, D — 2nd | | 10100... |
| | CDDA | | 100..... |
| | B & C, D — 1'st | Bank 3 | 011..... |
| | | 2 | 010..... |
| | | 1 | 001..... |
| | | 0 | 000..... |

(b)

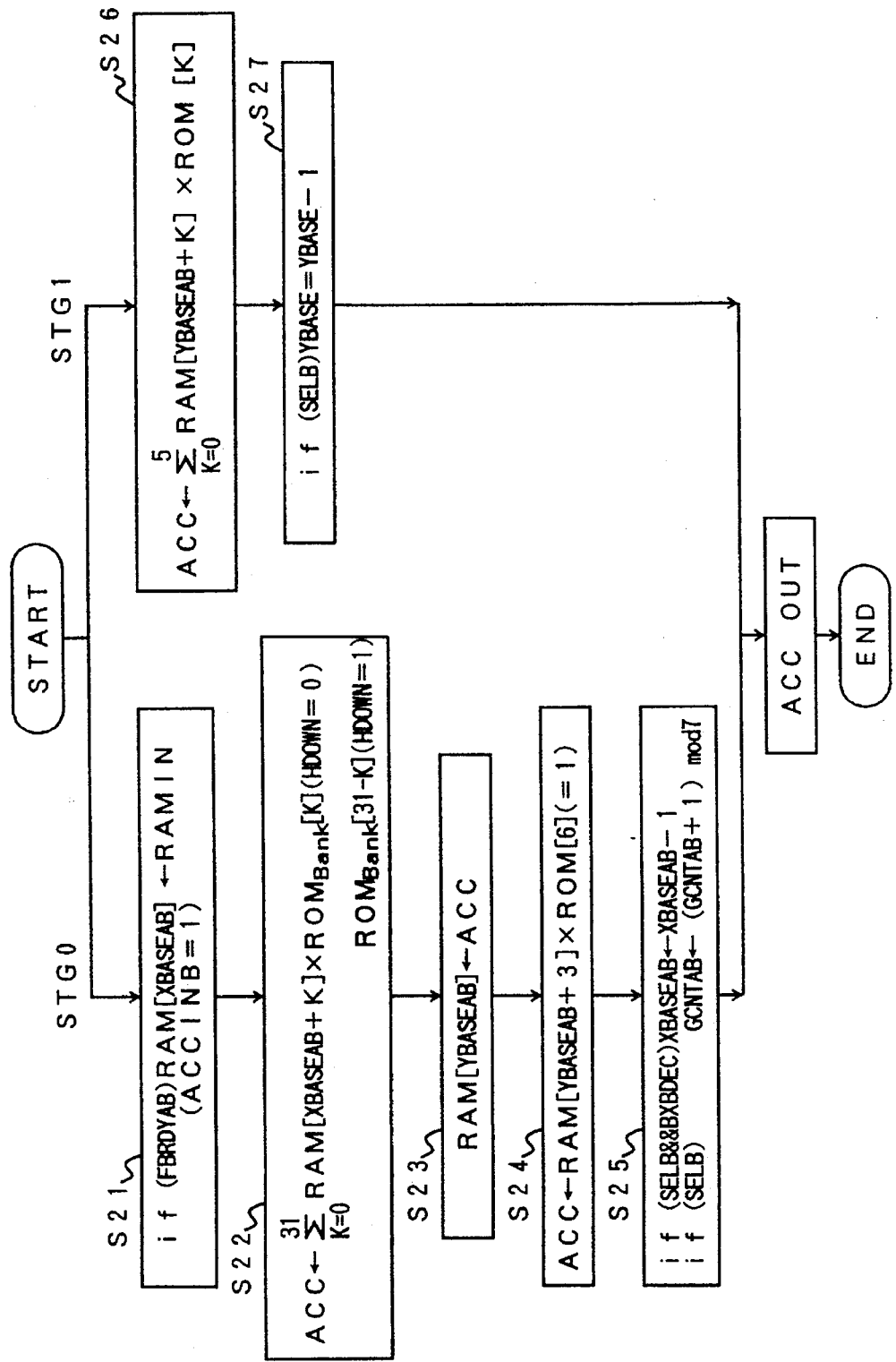

METHOD OF PROCESSING DIGITAL AUDIO SIGNALS OF DIFFERENT SAMPLING RATES

BACKGROUND OF THE INVENTION

The present invention generally relates to a digital audio signal processing method, and more particularly to a method of processing digital audio signals which provides digital audio processing and mixing capabilities for CD-ROM application systems which deal with input digital audio data of different data recording formats.

There are different data recording standards in which audio data is recorded on a compact disc within a CD-ROM (compact disc-read only memory) application system. For example, a 16-bit linear PCM (pulse code modulation) data recording format used by the CD-DA (compact disc-digital audio) standard, and ADPCM (adaptive differential PCM) data recording formats used by the CD-I (compact disc-interactive) standards and CD-ROM.XA standards.

The sampling rates of the CD-DA, the CD-I ADPCM Level A, the CD-I ADPCM Level B and the CD-I ADPCM Level C are 44.1 kHz, 37.8 kHz, 37.8 kHz and 18.9 kHz, respectively.

In order to convert the digital audio data from the compact disc into analog signals and output the analog signals, conventional D/A (digital-to-analog) converters and low pass filters are used. If the conventional D/A converters and low pass filters are used, it is necessary to provide a plurality of D/A converters with conversion rates that are respectively in conformity with the sampling rates of the above standard formats and a plurality of low pass filters with characteristics that are respectively in conformity with the sampling rates of the above standard formats.

In addition, in the case of the CD-ROM application systems, it may be necessary to perform the mixing of the CD-DA audio data and the CD-I ADPCM audio data and the reproducing of the mixed audio data. In this case, also, the D/A converters with conversion rates in conformity with the sampling rates of the standard formats and the low pass filters with characteristics in conformity with the sampling rates of the standard formats must be provided.

However, if the respective D/A converters and the respective low pass filters for each of the sampling rates of different standard formats are provided in a CD-ROM system, the construction of a complicated circuit is required and the cost of manufacture of that circuit must be high.

Further, if a digital filter circuit for mixing input digital audio signals of different formats mentioned above is provided for each of different channels, a CD-ROM system having such digital filter circuits must have a large size and the cost of manufacture of the CD-ROM system must be high.

SUMMARY OF THE INVENTION

Accordingly, it is a general object of the present invention to provide a novel and useful digital audio signal processing method in which the above-described problems are eliminated.

Another, more specific object of the present invention is to provide a digital audio signal processing method which realizes a simple and effective digital audio data processing and mixing for a CD-ROM system wherein the processing and mixing of digital audio input data of various data recording formats is carried out.

Still another object of the present invention is to provide a digital audio signal processing method which can accept digital audio signals of different sampling rates as inputs and can generate processed digital audio signals from the input digital audio signals at a unified sampling rate by use of a single digital filter circuit.

The above mentioned object of the present invention is achieved by a digital audio signal processing method which comprises steps of:

providing a digital filter circuit having a RAM for storing input digital audio signals of different sampling rates for each of channels, a ROM for storing groups of digital filter coefficients, and an accumulator for executing multiplications and additions based on the input digital audio signals and the digital filter coefficients;

reading the input digital audio signals of each sampling rate from the RAM;

reading the digital filter coefficients of each group from the ROM;

sequentially allocating one of divided time portions of one cycle of a unified sampling rate to the digital filter circuit, so that the accumulator executes the multiplications and additions for each channel during the allocated time portion so as to produce processed digital audio signals for all the channels within the one cycle; and outputting the processed digital audio signals for each of the channels at the unified sampling rate.

According to the present invention, it is possible to carry out the processing and mixing of input digital audio signals of different sampling rates for the channels by use of a single digital filter circuit. Since the digital filter circuit of the present invention outputs the processed digital audio signals for each channel at the unified sampling rate, it is possible to construct a CD-ROM system having only D/A converters with unified conversion rate and low pass filters with unified characteristics by use of the digital filter circuit. The CD-ROM system incorporating the digital audio signal processing method of the present invention can be simple and inexpensive, and it can provide a high speed processing.

BRIEF DESCRIPTION OF THE DRAWINGS

The above and other objects, features and advantages of the present invention will be more apparent from the following detailed description when read in conjunction with the accompanying drawings in which:

FIG. 4 is a diagram showing 224 digital filter coefficients, in a case of a 7/3 times over-sampling filter, which are arrayed in groups and taps;

FIG. 5 is a diagram for explaining a RAM address mapping;

FIG. 6 is a diagram for explaining a ROM address mapping;

FIG. 14 is a flow chart for explaining a digital filter process for processing ADPCM Level C digital audio data, which is performed by the digital filter circuit shown in FIG. 8.

DESCRIPTION OF THE PREFERRED EMBODIMENTS

A description will now be given of a preferred embodiment of a digital audio signal processing method according to the present invention.

In the preferred embodiment of the digital audio signal processing method, input digital audio signals of three different sampling rates: 18.9 kHz, 37.8 kHz and 44.1 kHz are processed to output processed digital audio signals at a unified sampling rate: 88.2 kHz.

In order to realize the mixing function, two sets of dual channels A, B (L, R) and C, D (L, R) are provided in a digital filter circuit, the channels A, B accepting input digital audio signals of the sampling rates: 18.9 kHz, 37.8 kHz and 44.1 kHz (CD-I ADPCM formats and CD-DA format), and the channels C, D accepting input digital audio signals of the sampling rates: 18.9 kHz and 37.8 kHz (CD-I ADPCM formats).

Further, a RAM for storing input digital audio signals of different sampling rates for the channels, provided in the digital filter circuit, is cleared prior to the start of outputting of the processed digital audio signals, so as to eliminate noises.

Next, a description will be given of various over-sampling filter circuits which are applied to the digital filter circuit incorporating the digital audio signal processing method according to the present invention, with reference to FIGS.1 through 4.

Figure 1:
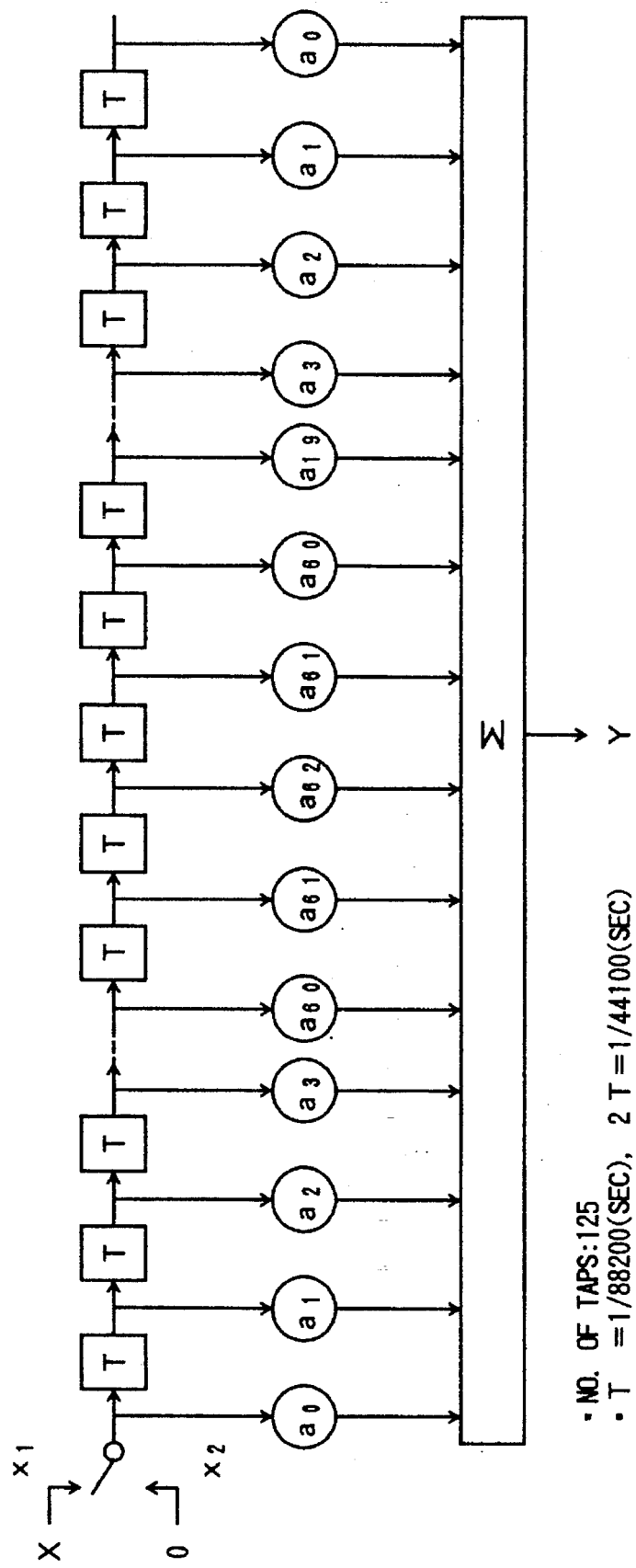
FIG. 1 is a block diagram showing a basic circuit of a twice over-sampling filter.

FIG. 1 shows a basic circuit of a twice over-sampling filter (44.1 kHz→88.2 kHz). This over-sampling filter circuit is to accept input digital audio signals of CD-DA format (44.1 kHz) and output processed digital audio signals at the unified sampling rate (88.2 kHz).

In FIG. I, 125 taps are provided in the twice over-sampling filter circuit. T indicates a period (1/88200 sec) of the unified sampling rate. Circled $a_n$ indicates a multiplication by a digital filter coefficient $a_n$ where n is an integer from 0–62.

A changeover switch switchable between input terminals X1 and X2 is connected to the input of the over-sampling filter circuit. The changeover switch is alternately turned to either the terminal X1 or the terminal X2 per period T. The input digital audio signals are input from the terminal X1 per period 2T, and values zeros are input from the terminal X2 per period 2T.

Therefore, the over-sampling filter circuit in FIG. 1 executes a multiplication and addition based on one of the input digital audio signals and one of the digital filter coefficients per period T, so as to realize the twice over-sampling.

By selecting appropriate characteristics of the over-sampling filter, the following digital filter coefficients $a_n$ can be obtained.

$$a_{n=1}\ (n=62),\ a_{n=0}\ (n=0,\ 2,\ 4,\ \ldots,\ 60) \qquad (1)$$

Figure 2:
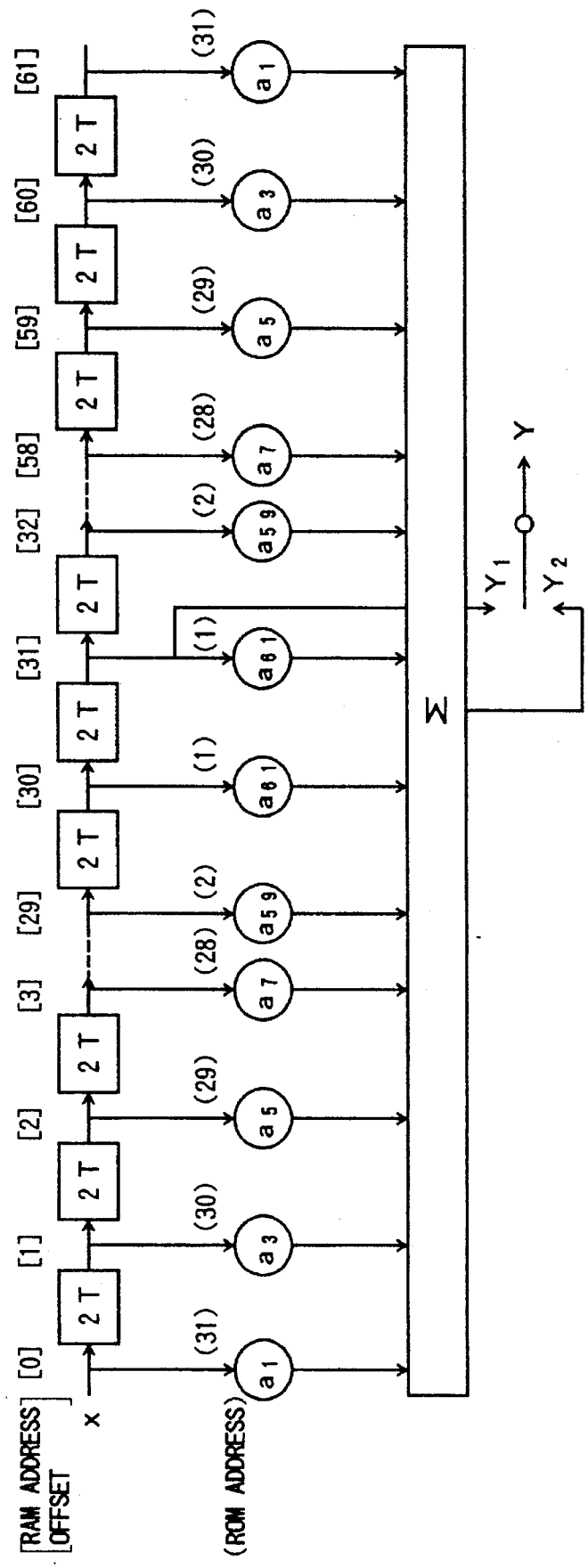
FIG. 2 is a block diagram showing a basic circuit of a half band filter.

FIG. 2 shows a basic circuit of a half band filter. The twice over-sampling described above can also be realized by use of the half band filter circuit in FIG. 2. A changeover switch switchable between terminals Y1 and Y2 is connected to an output of the half band filter circuit, the terminal Y1 being connected to the central tap [31] and the terminal Y2 being connected to an output of an accumulator. The changeover switch is alternately turned to either the terminal Y1 or the terminal Y2 per period T. A condition of the half band filter circuit in FIG. 2 wherein the switch is turned to the terminal Y1, is equivalent to the condition of the circuit in FIG. 1 wherein the switch is turned to the terminal X1. A condition of the half band filter circuit in FIG. 2 wherein the switch is turned to the terminal Y2, is equivalent to the condition of the circuit in FIG. 1 wherein the switch is turned to the terminal X2.

The half band filter circuit in FIG. 2 executes a sequence of multiplication and addition per period 2T (1/44100 sec). During the first half (the time portion T) of the period 2T, intermediate results of the multiplications and additions from the central tap [31]($a_6$!=1) are output via the terminal Y1. During the second half (T) of the period 2T, the final results of the multiplications and additions from the output of the accumulator are output via the terminal Y2.

The twice over-sampling based on the half band filter circuit shown in FIG. 2 is applied to the digital audio signal processing method of the present invention. In the preferred embodiment of the present invention, a shift register for shifting the input data is not used, and cyclic buffers of the RAM are used.

To carry out the digital filter calculations, there are a first phase of executing 62 multiplications and additions during one cycle (1/88200 sec) of the unified sampling rate (when turned to the terminal Y2), and a second phase of reading the temporarily stored data from the RAM during one cycle. Operating loads of the first and second phases are considerably different from each other.

In order to moderate the differences of the operating loads described above, the operations of 62 multiplications and additions are divided into two cycles in the preferred embodiment. During the first cycle (one of the divided time portions), the intermediate results of the 31 multiplications and additions from the central tap are transferred to work areas of the RAM. During the second cycle (the other of the divided time portions), the intermediate results are read from the RAM and the multiplications and additions are completely executed by using the read intermediate results to produce processed digital audio signals.

In order to realize the twice over-sampling filter circuit (44.1 kHz→→88.2 kHz) described above, the following procedures must be carried out.

First, the digital filter coefficients $a_n$ (n=1, 3, 5, ..., 61) relevant to the input digital audio signals of the CD-DA format are generated and stored in 32-word storage areas of the ROM. Values ones stored in the ROM address 0 (specified by the relative addressing). Since the digital filter coefficients in the left and right halves of the storage areas of the ROM are symmetrically arranged, only the digital filter coefficients in one of the two halves are stored.

Second, 64-word storage areas of the RAM are used to construct the cyclic buffers for storing the input digital audio signals. The actually-used storage areas are: 62 -word storage areas for storing the results of the digital filter multiplications and additions; and an one-word storage area for storing the intermediate results of the multiplications and additions. However, by using the 64-word storage areas of the RAM as the cyclic buffers whose buffer size is defined by $2^n$ where n=6, a base pointer for relative addressing of the cyclic buffers of the RAM can be readily constructed with a binary counter. The base address pointed by the base pointer is decremented per two cycles (2T) before each of the input digital audio signals appears at the input of the twice over-sampling filter circuit per period 2T.

Third, an address generator for generating a specific address of the ROM to read out each digital filter coefficient and a specific address of the RAM to read out each input digital audio signal, a multiply/add accumulator for executing multiplications and additions based on the input digital audio signals and the digital filter coefficients, and a sequencer for controlling operations of these circuits are constructed in the twice over-sampling filter circuit.

Figure 3:
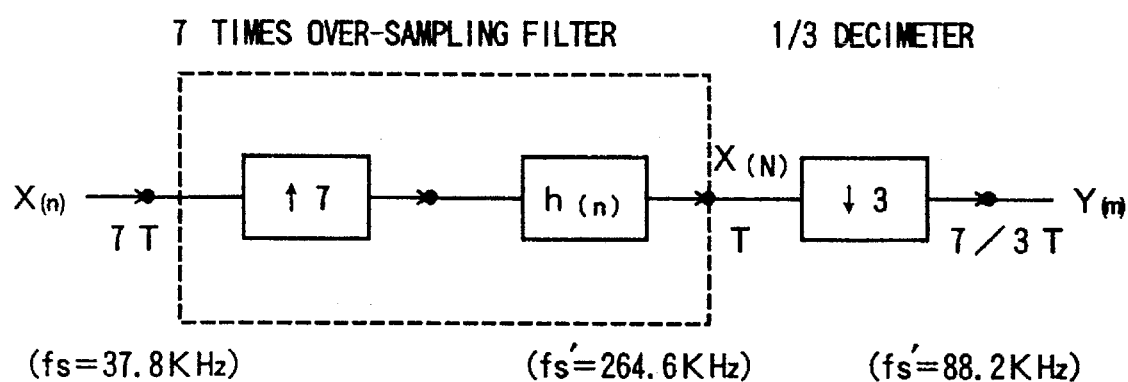
FIG. 3 is a block diagram showing a basic circuit of a 7/3 times over-sampling filter.

FIG. 3 shows a basic circuit of a 7/3 times over-sampling filter (37.8 kHz→>88.2 kHz). This over-sampling filter circuit is to accept input digital audio signals of CD-I ADPCM Level A/B format (37.8 kHz) and output processed digital audio signals at the unified sampling rate (88.2 kHz).

In FIG. 3, the 7/3 times over-sampling filter circuit is realized by combination of a 7 times over-sampling filter and a ⅓ decimeter circuit. The input digital audio signals x(n) of the sampling rate 37.8 kHz are input to the 7 times over-sampling filter, and the processed digital signals y(m) are output from the ⅓ decimeter at the unified sampling rate 88.2 kHz.

In a preferred embodiment of the 7/3 times over-sampling filter circuit, 224 (=7×32) taps are provided in the 7 times over-sampling filter. The processed digital audio signals y(m) in the preferred embodiment are represented by the following formula.

$$y(m) = \sum_{n=3}^{31} g_{(m\,mod7)}(n) \cdot x([3/7] - n) \quad (2)$$

where $g_m(n) = h(7n + 3m\,mod7)$ \quad (3)

In order to realize the 7/3 times over-sampling filter circuit (37.8 kHz→>88.2 kHz) in the preferred embodiment based on the above formula (2) and (3), the following procedures must be carried out.

First, the coefficients $h_n$ (n=0, 1, . . . , 223) according to the above formula (3) are generated. Since the coefficients in the left and right halves thereof are symmetrically arranged (h (j)=h (223−j)), only a half of the coefficients (j=0, 1, . . . , 111) are generated.

Second, values of the digital filter coefficients $g_m$ (k) where m=0, 1, . . . , 6 and k=0, 1, . . . , 31 according to the above formula (3) are generated. In this respect, m is a group number allocated to each group, and k is a tap number allocated to each of 32 taps of one group. The value of m is incremented per cycle T and returns to zero per period 7T. FIG. 4 shows 224 digital filter coefficients, in the case of the 7/3 times over-sampling filter, which are arrayed in groups and taps.

Third, the digital filter coefficients $g_m$ (k) are stored in the ROM. By improving the method of accessing the ROM, the storage areas of the ROM for storing the digital filter coefficients $g_m$ (k) can be reduced from 224 words to 128 words. As shown in FIG. 4, the $g_m$ (k) in the cases of g =0 and 2, g =3 and 6, or g=4 and 5 are arranged in the opposite orders. Thus, in the preferred embodiment, only the digital filter coefficients $g_m$ (k) in the cases of g=0, 3, 4 and 1 are stored in four 32-word storage areas of the ROM. When the $g_m$ (k) in the cases of g=0, 3, 4 and 1 are read from (or written to) the ROM, a forward sorting direction signal and a group designating signal are generated. On the other hand, when the $g_m$ (k) in the cases of g=2, 6 and 5 are read from (or written to) the ROM, a reverse sorting direction signal and a group designating signal are generated.

Fourth, 32-word storage areas of the RAM are used to construct the cyclic buffers for storing the input digital audio signals. The base address pointed by the base pointer (the binary counter) is three times decremented per seven cycles (7T) before each of the input digital audio signals appears at the input of the 7/3 times over-sampling filter circuit.

Fifth, an address generator for generating a specific address of the ROM to read out each digital filter coefficient and a specific address of the RAM to read out each input digital audio signal, a multiply/add accumulator for executing multiplications and additions based on the input digital audio signals and the digital filter coefficients, and a sequencer for controlling operations of these circuits are constructed in the 7/3 times over-sampling filter circuit.

Next, a description will be given of a 14/3 times over-sampling filter circuit (18.9 kHz→>88.2 kHz). This over-sampling filter circuit is to accept input digital audio signals of CD-I ADPCM Level C/D format (18.9 kHz) and output processed digital audio signals at the unified sampling rate (88.2 kHz).

Similar to the above 7/3 times over-sampling filter circuit, the 14/3 times over-sampling filter circuit is realized by combination of a 7/3 times over-sampling filter and a twice over-sampling filter. This 7/3 times over-sampling filter circuit operates for the first half (one cycle) of period (2T) in the same manner as described above. This twice over-sampling filter circuit includes 13 taps, and the structure thereof is the same as that of the half band filter circuit shown in FIG. 2.

In order to realize the 14/3 times over-sampling filter circuit (18.9 kHz→88.2 kHz) in the preferred embodiment, the following procedures must be carried out.

First, the above 7/3 times over-sampling filter circuit is provided in the 1st stage part of the 14/3 times over-sampling filter circuit.

Second, the digital filter coefficients $a_n$ (n=1, 3, 5, 7, 9 and 1) for the 2nd stage (the twice over-sampling filter circuit) are generated and stored in the ROM. Since the twice over-sampling filter circuit includes a small number of taps, all the digital filter coefficients are stored in the ROM. Values ones are stored in the ROM at address [6].

Third, 8-word storage areas of the RAM are used to construct the cyclic buffers for storing the input digital audio signals. The actually-used storage areas of the RAM are 7-word storage areas, but, in order to readily construct the base pointer of the cyclic buffers with a binary counter, the cyclic buffers whose buffer size is defined by $2^n$ where n=3 are used. The base address pointed by the base pointer (the binary counter) is decremented per four cycles (4T).

Fourth, an address generator for generating a specific address of the ROM to read out each digital filter coefficient and a specific address of the RAM to read out each input digital audio signal, a multiply/add accumulator for executing multiplications and additions based on the input digital audio signals and the digital filter coefficients, and a sequencer for controlling operations of these circuits are constructed in the 14/3 times over-sampling filter circuit.

Next, a description will be given of address mapping used in the RAM and in the ROM, with reference to FIGS. 5 and 6.

FIG. 5 shows a RAM address mapping in the preferred embodiment. In FIG. 5, (a) indicates a RAM address map, and (b) indicates an address offset used for the relative addressing of the RAM. The digital audio data of the channels A and B (Levels DA, B and C) is input to the twice over-sampling filter circuit, and 64-word storage areas of the RAM are used for each of the channels A and B. The digital audio data of the channels C and D (Levels B and C) is input to the 7/3 times over-sampling filter circuit, 32-word storage areas of the RAM are used for each of the channels C and D. Further, 8-word storage areas of the RAM are used for each of the channels C and D (Levels C and D).

FIG. 6 shows a ROM address mapping in the preferred embodiment. In FIG. 6, (a) indicates a ROM address map, and (b) indicates an address offset used for relative addressing of the ROM. The digital filter coefficients of the CD-DA (Level DA) are read out by the twice over-sampling filter circuit, and a 32-word storage area of the ROM is used for the CD-DA (Level DA). The Banks 0–3 (Levels B–D, the 1st stage) are used for the above four cases of g=1, g=0 or 2, g=3 or 6 and g=4 or 5, four 32-word storage areas of the ROM are used as described above.

Next, a description will be given of a time-division multiplexing for the digital audio signal processing of the four channels A, B (L, R) and C, D (L, R), with reference to FIG. 7.

Figure 7:
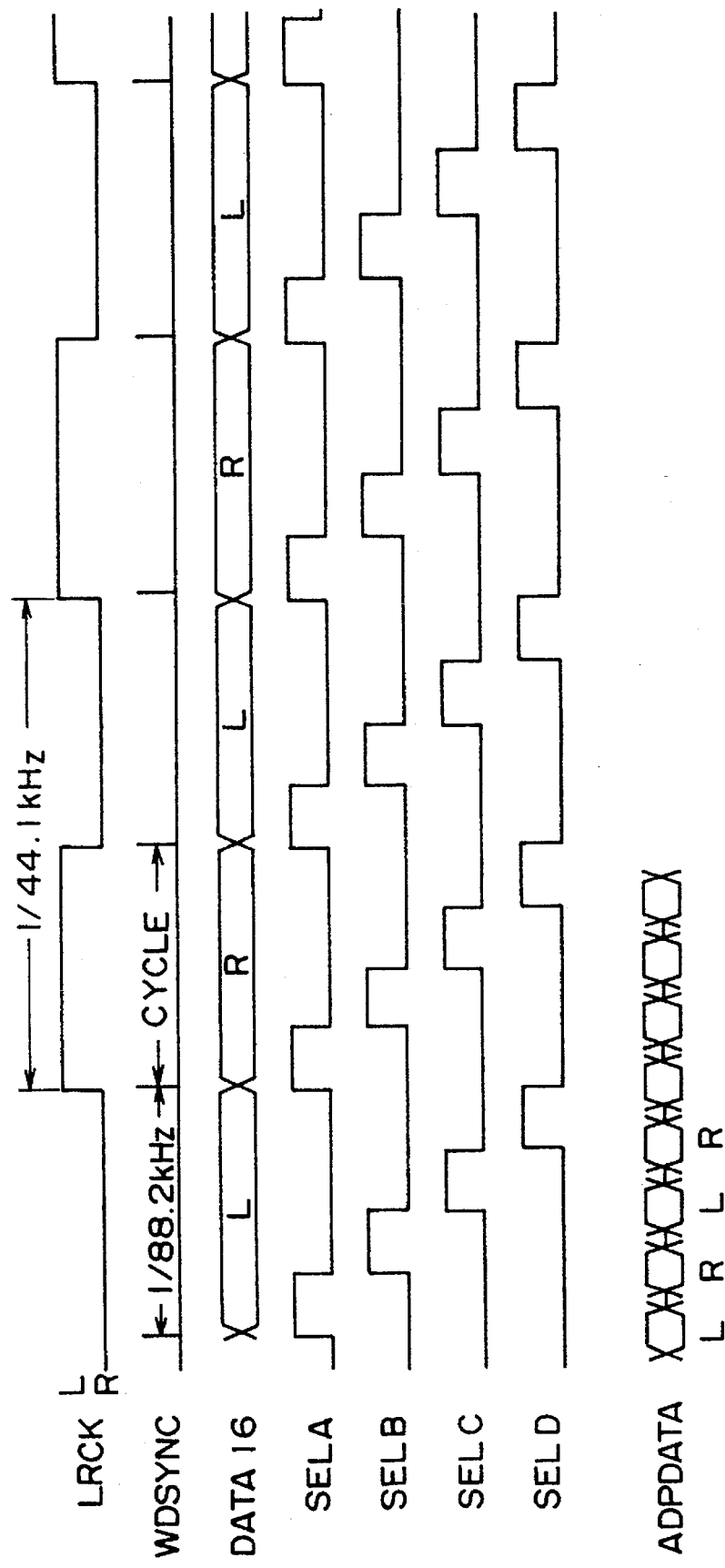
FIG. 7 is a time chart for explaining a time-division multiplexing for processing the respective audio data of channels A through D.

In FIG. 7, LRCK indicates a L/R changeover clock signal, and one period of this clock signal is equal to 1/44100 sec. WDSYNC indicates a sync signal which is generated in synchronism with each of the leading and trailing edges of the LRCK clock signal, and one cycle of this sync signal being generated is equal to 1/88200 sec. DATA16 indicates a CD-DA digital audio data signal.

The above LRCK and WDSYNC signals are supplied to a RAM input selector (which will be described later) for the synchronization of the digital filter process for the digital audio L/R channel data signals.

Further, in FIG. 7, ADPDATA indicates a CD-I ADPCM digital audio data signal. SELA-SELD indicate the respective states of operation of the over-sampling filter circuits for the channels A–D. As shown in FIG. 7, the time-division multiplexing for the digital audio signal processing of the four channels A–D is realized by performing four filtering calculations per cycle.

For the sake of convenience, a case in which the CD-DA digital audio data is processed by use of the channels A and B and the CD-I ADPCM Level B digital audio data is processed by use of the channels C and D, will be described by referring to FIG. 7.

In this case, during the first divided time portion (SELA) of one cycle (the first stage), the DATA16 L-channel data is input to the RAM, and multiplications and additions with respect to half of the 62-word input data are executed. The processed data from the central tap of the over-sampling filter circuit is output, and the intermediate results of the multiplications and additions are stored in work areas of the RAM. After the above procedures are done, the second divided time portion (SELB) of that cycle starts.

During the second divided time portion (SELB), the DATA16 R-channel data, held by a latch of the RAM input selector (which will be described later), is input to the RAM, and multiplications and additions with respect to half of the 62-word input data are executed. The processed data from the central tap of the over-sampling filter circuit is output, and the intermediate results of the multiplications and additions are stored in the work areas of the RAM. After the above procedures are done, the third divided time portion (SELC) of that cycle starts.

During the third divided time portion (SELC), the ADPCM data is input to the RAM, and multiplications and additions with respect to the input data are executed. When the input data is actually accepted, the base address of the base pointer is decremented. However, when no input data is actually accepted, the base address of the base pointer is not decremented. After the above procedures are done, the fourth divided time portion (SELD) of that cycle starts.

During the fourth divided time portion (SELD), the same procedures as the SELC time portion are performed. After they are done, the first divided time portion of next cycle starts.

During the first divided time portion of next cycle (the 2nd stage), multiplications and additions with respect to the remainder of the 62-word, DATA16 L-channel input data are executed, and the processed data based on the final results of all the multiplications and additions are output. Similarly, during the second divided time portion of next cycle (the 2nd stage), multiplications and additions with respect to the remainder of the 62-word, DATA16 R-channel input data are executed, and the processed data based on the final results of all the multiplications and additions are output.

In the above case, the CD-I ADPCM Level B input data is processed by use of the channels C and D, and it is not necessary to perform two separate stages. However, when the CD-I ADPCM Level C input data is processed by use of the channels C and D, it is necessary to separately perform the first and second stages for two cycles, similarly to the channels A and B of the above case.

Next, a description will be given of a digital filter circuit which carries out the digital audio signal processing method according to the present invention, with reference to FIGS. 8 through 11.

Figure 8:
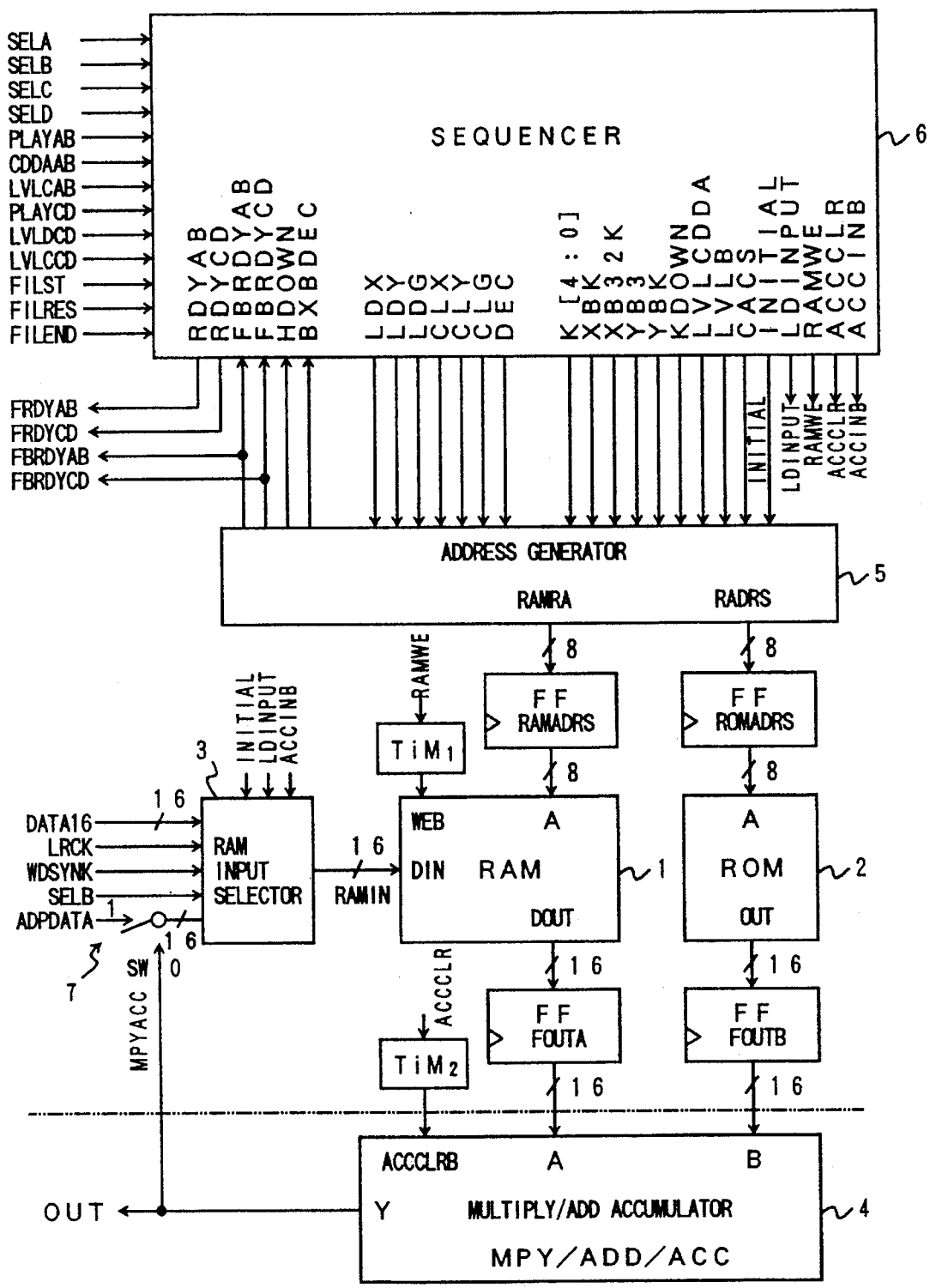
FIG. 8 is a circuit diagram showing a digital filter circuit which carries out a digital audio signal processing method according to the present invention.

FIG. 8 shows a digital filter circuit which carries out the digital audio signal processing method according to the present invention. In FIG. 8, there are shown a RAM 1, a ROM 2, a RAM input selector 3, a multiply/add accumulator 4, an address generator 5, and a sequencer 6.

The RAM 1 is a memory for storing input digital audio data, and the ROM 2 is a memory for storing groups of digital filter coefficients. The RAM input selector 3 is to select one of the digital audio data L and R channel inputs to the RAM 1. The multiply/add accumulator 4 is an accumulator for executing the sum of the respective products between the digital audio data from the RAM 1 and the digital filter coefficients from the ROM 2 to produce processed digital audio data. The address generator 5 is to generate each specific address of the RAM 1 to read out a piece of the specified digital audio data therefrom, and each specific address of the ROM 2 to read out one of the specified digital filter coefficients therefrom. The sequencer 6 is a controller for controlling the operations of the above mentioned circuits of the digital filter circuit in FIG. 8.

Figure 9:
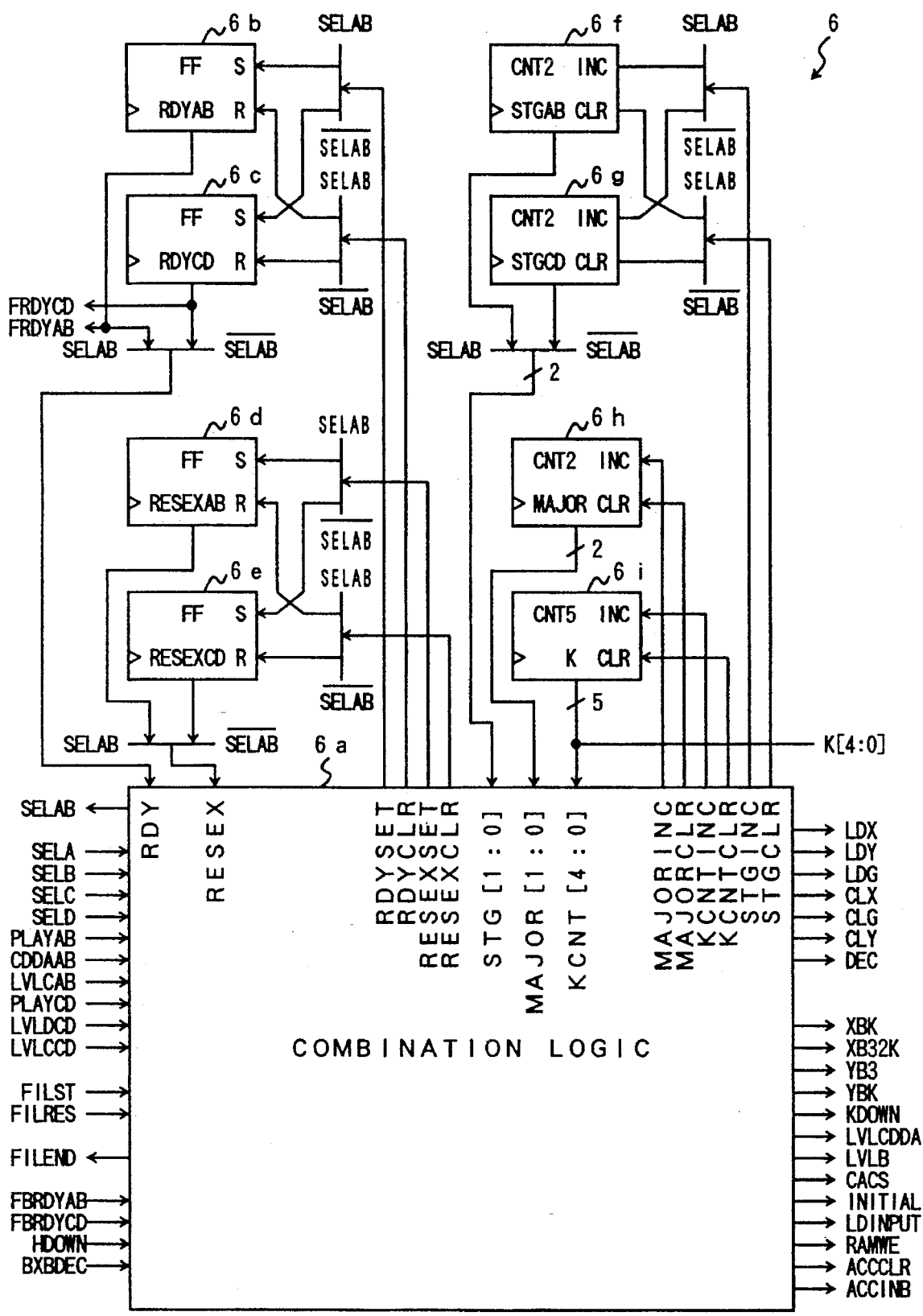
FIG. 9 is a circuit diagram showing a sequencer of the digital filter circuit shown in FIG. 8.

FIG. 9 shows the sequencer 6 of the digital filter circuit shown in FIG. 8. In FIG. 9, the sequencer 6 comprises a combination logic 6a which accepts several timing, selecting and control signals as inputs, and outputs timing, selecting and control signals to the address generator 5 and several registers and counters.

In FIG. 9, flipflops 6b and 6c (RDYAB, RDYCD) are set to output ready signals FRDYAB and FRDYCD when the channels A, B or the channels C, D are reset to clear the related areas of the RAM 1 for the channels. The flipflops 6b and 6c are reset at the start of the digital filter operation.

A control unit (not shown in FIG. 9) detects the cleared state of the RAM 1 by checking that the ready signals FRDYAB and FRDYCD are received from the flipflops 6b and 6c. In addition, flipflops 6d and 6e (RESEXAB, RESEXCD) are set to output internal timing signals when the reset sequence is run.

In FIG. 9, counters 6f and 6g (STGAB, STGCD) are 2-bit counters which hold either of stage signals (STG0, STG1) for each channel. The stage signals are to detect which stage of the digital filter calculations is run for each channel. As described above, the CD-DA and ADPCM Level C sequences are run for two cycles, and the stage signals are used to detect which stage is to be run. A counter 6h (MAJOR) is a 2-bit counter which outputs a state signal to specify the running state of each of the channels for each cycle. A counter 6i (K) is a 5-bit counter which outputs a state signal and relative address signals. The state signal from the counter 6i is used to specify the running state of each of the channels for each cycle in conjunction with the state signal from the counter 6h. The relative address signals from the counter 6i are used for the address generator 5 to generate the accessing addresses of the RAM 1 and ROM 2.

Figure 10:
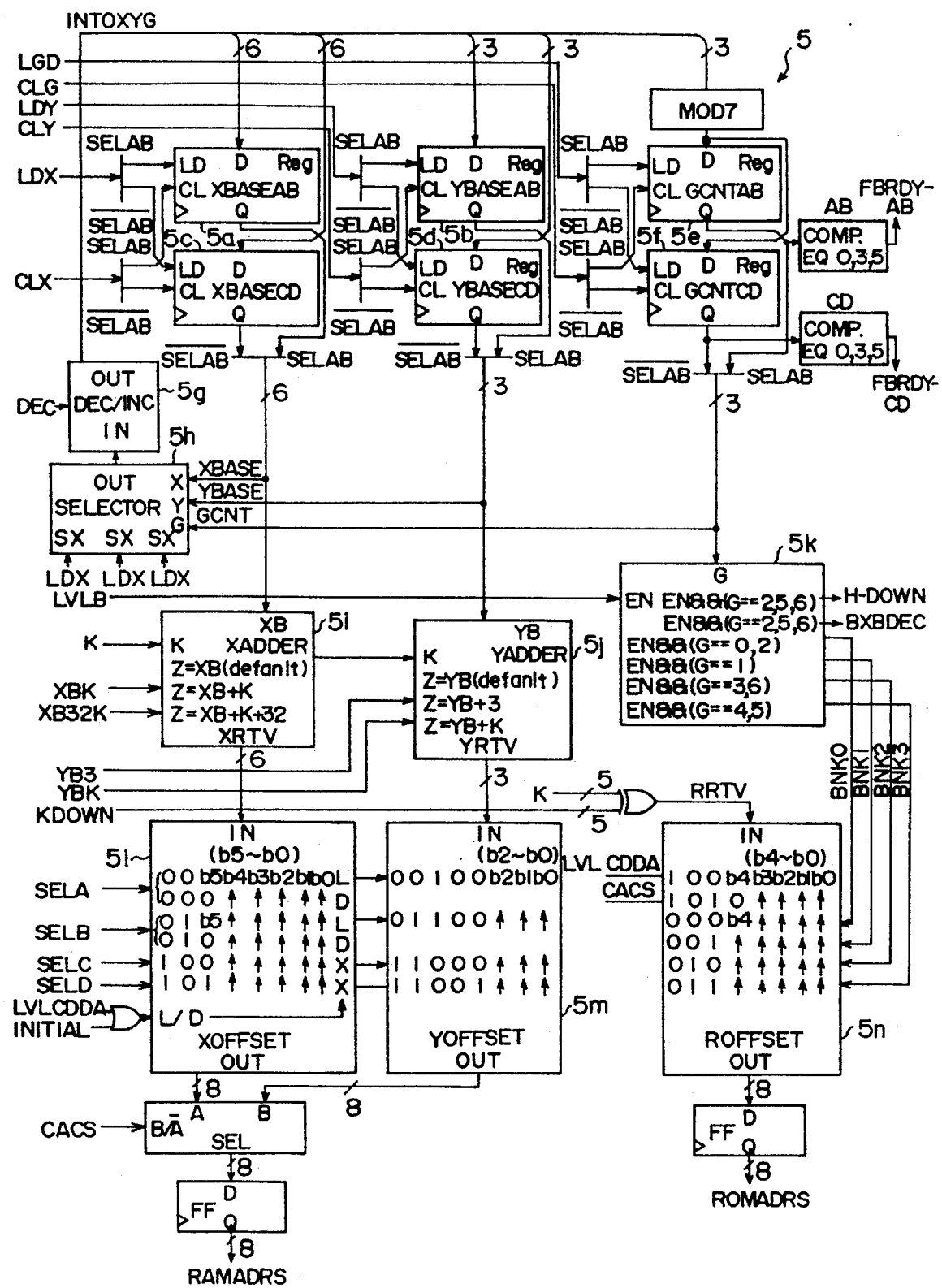
FIG. 10 is a circuit diagram showing an address generator of the digital filter circuit shown in FIG. 8.

FIG. 10 shows the address generator 5 of the digital filter circuit shown in FIG. 8. In FIG. 10, a 10 register 5a (XBASEAB), a register 5b (YBASEAB), a register 5c (XBASECD), and a register 5d (YBASECD) constitutes the base pointer of the cyclic buffers of the RAM 1 for the four channels A–D. A decrementer/ incrementer 5g (DEC/INC) and a selector 5h are used to change the base pointed by the base pointer for each channel.

In addition, a register 5e (GCNTAB) and a register 5f (GCNTCD) hold state signals which indicate one of 7 sequences of the ADPCM Level B filter operations. The XBASEAB and XBASECD of the above registers 5a and 5c are provided to indicate the base addresses of the Level DA areas of the RAM for the channels A–D in FIG. 5. The YBASEAB and YBASECD of the above registers 5b and 5d are provided to indicate the base addresses of the Level CD, 2nd areas of the RAM for the channels A–D in FIG. 5.

The relative addresses of the RAM 1 are specified by the base address signal from the base pointer registers, the signal (K) of the counter 6i, and the offset value specified for each level of the channels. As for the CD-DA and CD-I ADPCM Level B filter processes, the address generator 5 includes an adder 5i and an offset generating unit 51. The adder 5i adds the relative address signal K from the counter 6i to the XBK or XBK32K. The offset generating unit 51 generates the offset value for each level of the channels. As for the CD-I ADPCM Level C filter process, the address generator 5 includes an adder 5j and an offset address generator 5m in addition to the adder 5i and offset generating unit 51.

The relative addresses of the ROM 2 are specified by the base address signal (RRTV) from the counter 6i (K) and the offset value from an offset generating unit 5n. The offset value is specified for each level of the channels. For the CD-I ADPCM Level B and Level C, D 1st stage filter processes, a BNK generating unit 5k generates one of BNK0 (g=0, 2), BNK1 (g=1), BNK2 (g=3, 6) and BNK3 (g=4, 5) based on the group number (g=0–7) supplied from the register 5e (GCNTAB) or the register 5f (GCNTCD). See FIG. 4 and FIG. 6.

In addition, the BNK generating unit 5k outputs a reverse sorting direction signal (HDOWN ="1") when the group number g=2, 5 and 6, and outputs a forward sorting direction signal (HDOWN="0") when the group number g=0, 1, 3 and 4. The BNK generating unit 5k outputs a decrement signal (BXBDEC="1") to decrement the value of XBASEAB when the group number g=2, 4 and 6.

Figure 11:
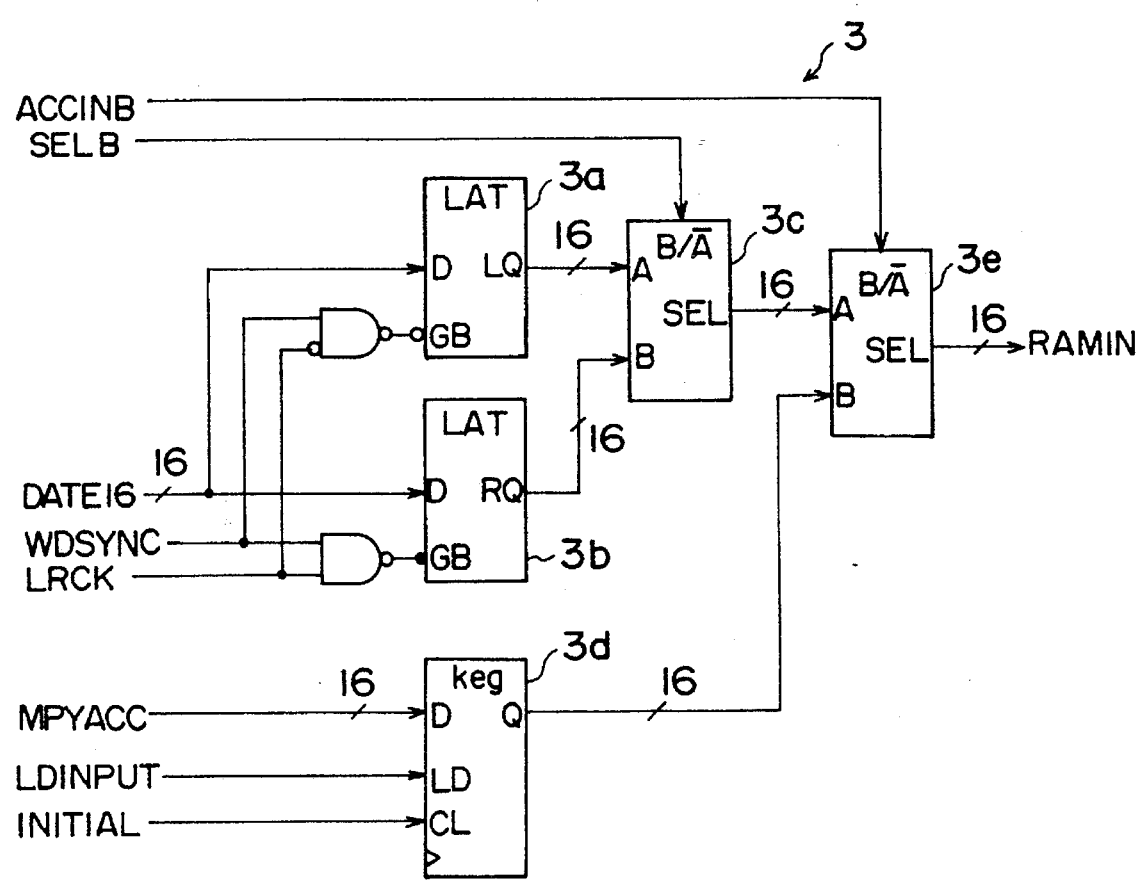
FIG. 11 is a circuit diagram showing a RAM input selector of the digital filter circuit shown in FIG. 8.

FIG. 11 shows the RAM input selector 3 of the digital filter circuit shown in FIG. 8. The 16-bit, CD-DA input data (DATA16 ) is supplied to the RAM input selector 3 in synchronism with the clock signal LRCK and the sync signal WDSYNC. The L-channel input data and the R-channel input data are respectively held by a latch 3a and a latch 3b When the signal SELB is "1" a selector 3c supplies the input data from the latch 3b to a selector 3e When the signal SELB is "0" the selector 3c supplies the input from the latch 3a to the selector 3e.

The CD-I ADPCM input data (MPYACC) is input to the RAM input selector 3, and it is held by a register 3d. When the signal ACCINB is "1", the selector 3e supplies the input data from the register 3d to the RAM 1 When the signal ACCINB is "0" the selector 3e supplies the input data from the selector 3c to the RAM 1.

In addition, the data signal MPYACC may indicate the data supplied from the multiply/add accumulator 4, and this data signal is supplied to the RAM 1. As described above, the intermediate results of the multiplications additions are temporarily stored in the RAM 1 in some cases.

Next, a description will be described of several digital filter processes performed by the digital filter circuit shown in FIG. 8, with reference to FIGS.12 through 14.

Figure 12:
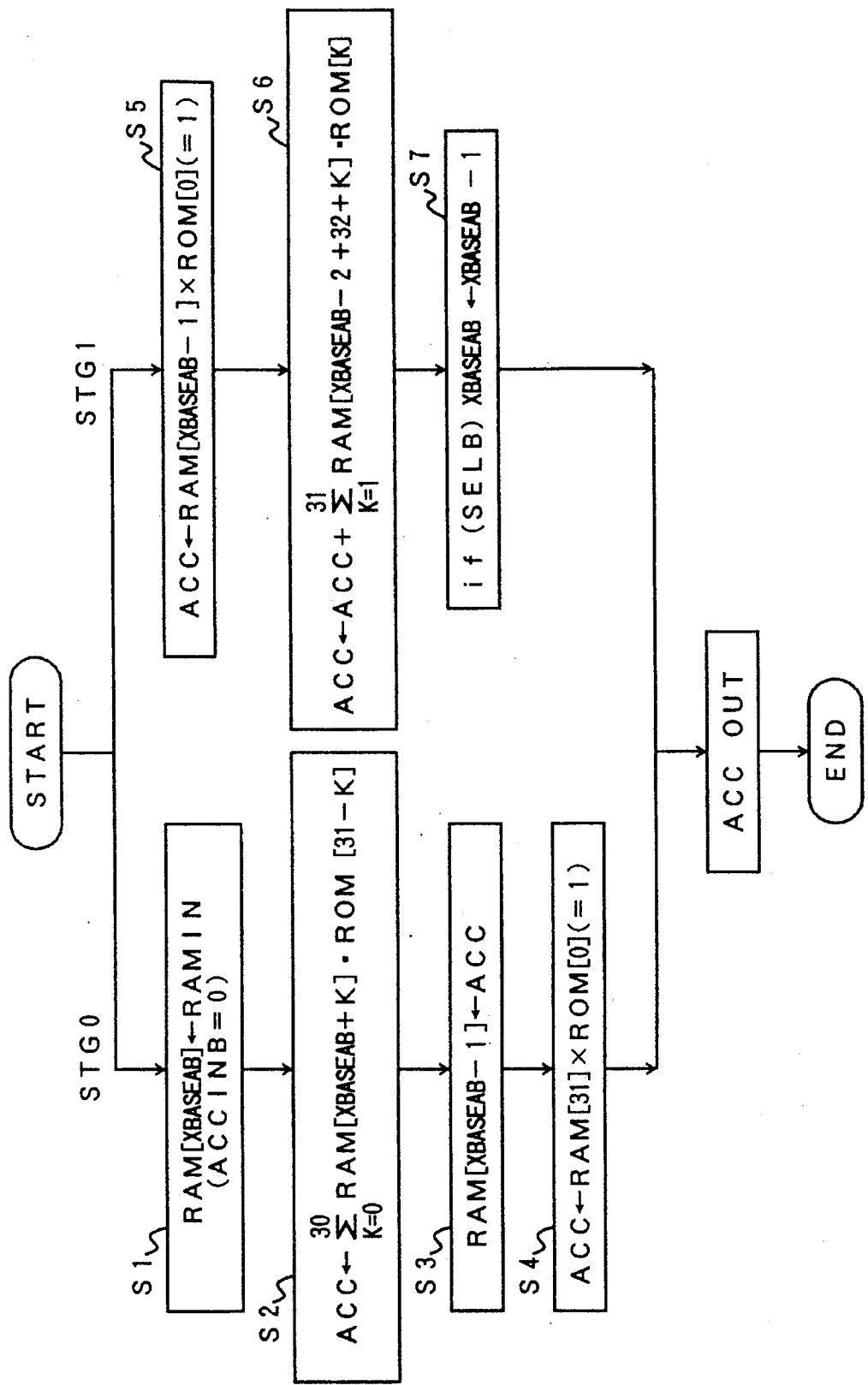
FIG. 12 is a flow chart for explaining a digital filter process for processing CD-DA digital audio data, which is performed by the digital filter circuit shown in FIG. 8.

FIG. 12 is a flow chart for explaining a digital filter process for processing CD-DA digital audio data (44.1 kHz→88.2 kHz). The flow chart in FIG. 12 indicates the CD-DA filter process of the channels A and B. A flow chart indicating a CD-DA filter process of the channels C and D is the same as shown in FIG. 12.

When the first stage (STGO) is performed, step S1 stores the input data RAMIN in the RAM 1 at the relative address of the RAM pointed by the base pointer (XBASEAB). Step S2 executes multiplications and additions based on the input data stored in the RAM. The digital filter coefficients related to the input data are read from the ROM.

Step S3 stores the results of the multiplications and additions in step S2 in the cyclic buffer of the RAM for the second stage whose address is pointed by the base pointer. Step S4 transfers the digital audio data (the central data) from the RAM (31) to the accumulator 4 and transfers, at the same time, values ones ("1") from the ROM (0) to the accumulator 4.

On the other hand, when the second stage (STG1) is performed, step S5 executes multiplications and additions based on the six pieces of the input data stored in the 2nd stage cyclic buffers of the RAM 1.

Before the results of the multiplications and additions in step S5 are output by the accumulator, step S6 is performed. In step S6, if the signal SELB is "1"the base address YBASE is decremented Then, the results in step S6 are output by the accumulator.

Figure 13:
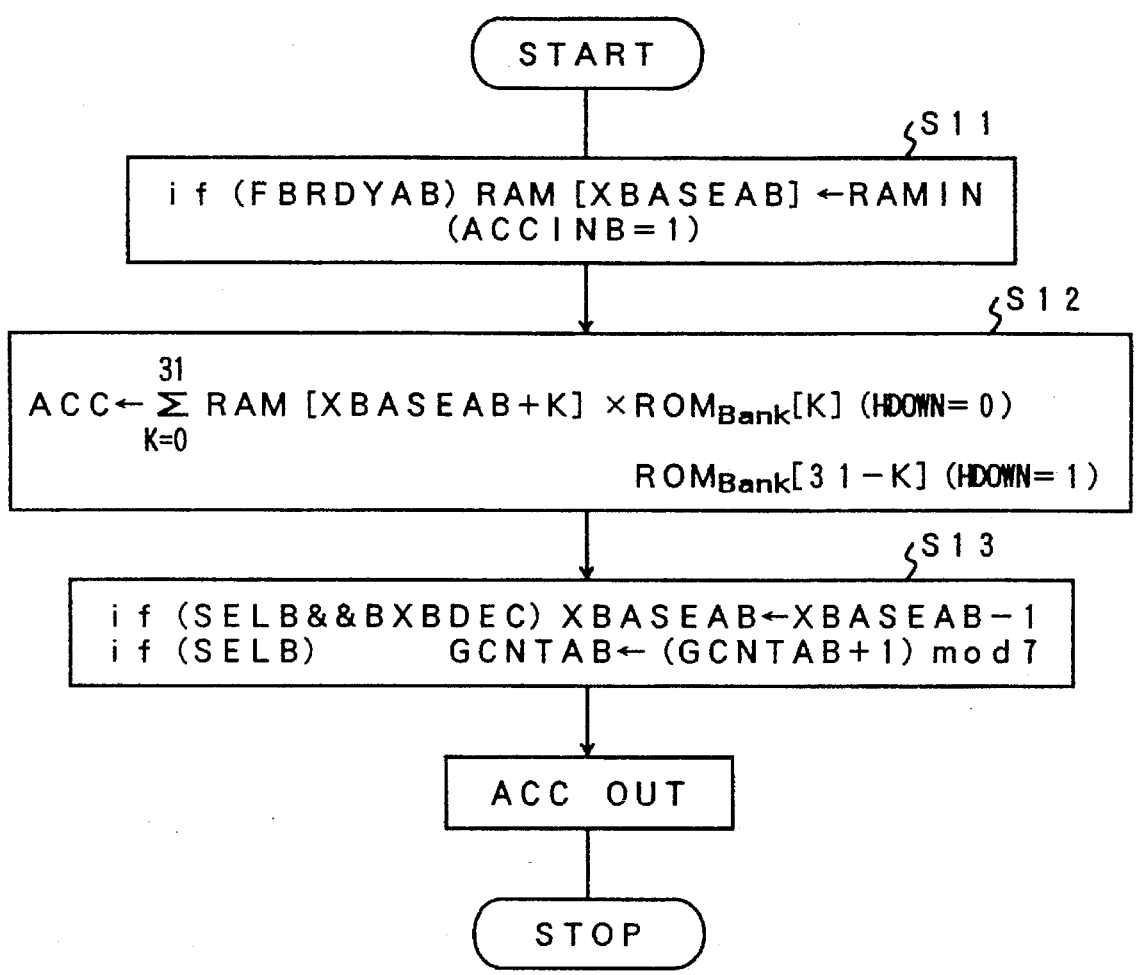
FIG. 13 is a flow chart for explaining a digital filter process for processing ADPCM Level B digital audio data, which is performed by the digital filter circuit shown in FIG. 8.

FIG. 13 is a flow chart for explaining a digital filter process for processing ADPCM Level B digital audio data (37.8 kHz→88.2 kHz). The flow chart in FIG. 13 indicates the ADPCM Level B filter process of the channels A and B. A flow chart indicating an ADPCM Level B filter process of the channels C and D is the same as shown in FIG. 13.

In the filter process shown in FIG. 13, three out of seven pieces in the input ADPCM data are accepted per seven cycles. Step S11 stores the input data RAMIN in the RAM 1 at the relative address of the RAM pointed by the base pointer (XBASEAB). The signal FBRDYAB is set to "1"by the address generator 5 when the signal GNTTAB is 0, 3 or 5. The signal ACCINB is "1"the data from the register 3d is selected, and the input ADPCM data is accepted.

Step S12 executes multiplications and additions based on the input data stored in the RAM. The digital filter coefficients related to the input data are read from the ROM by generating a group designating signal (GCNTAB=0–6) and a forward/reverse sorting direction signal (HDOWN=0–1).

Step S13 decrements the base address (XBASEAB) pointed by the base pointer if the signal SELB is "1"and the signal BSBDEC is "1"and increments the group number (GCNTAB) if the signal SELB is "1". Then, the results in step S12 are output by the accumulator.

FIG. 14 is a flow chart for explaining a digital filter process for processing ADPCM Level C digital audio data (18.9 kHz→88.2 kHz). The flow chart in FIG. 14 indicates the ADPCM Level C filter process of the channels A and B. A flow chart indicating an ADPCM Level C filter process of the channels C and D is the same as shown in FIG. 14.

The filter process in FIG. 14 is a combination of the filter process in FIG. 12 and the filter process in FIG. 13. In the example shown in FIG. 14, the ADPCM Level B filter process in FIG. 13 is performed per two cycles.

When the first stage (STG0) is performed, step S21 stores the input data RAMIN in the RAM 1 at the relative address of the RAM pointed by the base pointer (XBASEAB). Step S22 executes multiplications and additions based on the input data stored in the RAM. The digital filter coefficients related to the input data are read from the ROM by generating a group designating signal (GCNTAB =0–6) and a forward/reverse sorting direction signal (HDOWN =0–1).

Step S23 stores the results of the multiplications and additions in step S22 in the cyclic buffer of the RAM for the second stage whose address is pointed by the base pointer (YBASEAB). Step S24 transfers the digital audio data (the central data) from the RAM (YBASEAB+3) to the accumulator 4 and transfers, at the same time, values ones ("1") from the ROM (6) to the accumulator 4.

Step S25 decrements the base address (XBASEAB) pointed by the base pointer if the signal SELB is "1"and the signal BSBDEC is "1"and increments the group number (GCNTAB) if the signal SELB is "1". Then, the results in step S24 are output by the accumulator.

On the other hand, when the second stage (STG1) is performed, step S26 executes multiplications and additions based on the six pieces of the input data stored in the 2nd stage cyclic buffers of the RAM 1.

Before the results of the multiplications and additions in step S26 are output by the accumulator, step S27 is performed. In step S27, if the signal SELB is "1"the base address YBASE is decremented Then, the results in step S26 are output by the accumulator.

Further, the present invention is not limited to the above described embodiments, and various variations and modifications may be made without departing from the scope of the present invention.

What is claimed is:

1. A method of processing input digital audio signals of different sampling rates by use of a single digital filter circuit, comprising steps of:

providing a digital filter circuit having a RAM for selectively storing the input digital audio signals for each of a plurality of channels, a ROM for storing groups of digital filter coefficients, and an accumulator for executing multiplications and additions based on said input digital audio signals and said digital filter coefficients;

reading the input digital audio signals of each sampling rate from the RAM; reading the stored groups of digital filter coefficients from the ROM;

sequentially allocating one of divided time portions of one cycle of a unified sampling rate to the digital filter circuit, so that the accumulator executes said multiplications and additions for each channel during the allocated time portion so as to produce processed digital audio signals for all the channels within the one cycle; and outputting the processed digital audio signals for each of the channels at the unified sampling rate, the processed digital audio signals output for each of the channels at the unified sampling rate corresponding to the input digital audio signals of different sampling rates.

2. The method according to claim 1, wherein the processed digital audio signals for each channel is produced at the unified sampling rate through L/N times over-sampling, where L and N are integers, said L/N times over-sampling being performed based on the input digital audio signals of each sampling rate and the digital filter coefficients of each group.

3. The method according to claim 2, wherein the number of the groups of the digital filter coefficients, stored in the ROM, corresponds to the integer L.

4. The method according to claim 1, wherein the groups of the digital filter coefficients are respectively stored in the ROM at different addresses, said addresses being specified for each group.

5. The method according to claim 1, wherein the digital filter coefficients of each group are read from the ROM by generating a group designating signal and a forward/reverse sorting direction signal.

6. The method according to claim 1, wherein the input digital audio signals of the different sampling rates are stored in cyclic buffers of the RAM, the cyclic buffers being allocated to the respective channels, the cyclic buffers having a buffer size defined by $2^n$ where n is an integer, thus relative addresses of the cyclic buffers of the RAM being specified by using a binary counter as a base pointer.

7. The method according to claim 1, wherein intermediate results of the multiplications and additions for one channel are produced by the accumulator and stored in work areas of the RAM during an allocated time portion of one cycle of the unified sampling rate, and during a subsequently allocated time portion said intermediate results are read from the RAM and the multiplications and additions are completely executed by using said read intermediate results to produce processed digital audio signals for that channel.

8. The method according to claim 1, wherein values ones from the ROM are transferred to the accumulator when the digital audio signals from the RAM are directly transferred to the accumulator.

* * * * *